Feb. 2, 1960 D. K. HAUSEN 2,923,642

MAGNETIC RECORDING TAPE

Filed Oct. 19, 1955

INVENTOR.
DIETRICH K. HAUSEN
BY Toulmin & Toulmin
ATTORNEYS

United States Patent Office 2,923,642
Patented Feb. 2, 1960

2,923,642

MAGNETIC RECORDING TAPE

Dietrich K. Hausen, Dayton, Ohio, assignor to The Commonwealth Engineering Company of Ohio, Dayton, Ohio, a corporation of Ohio Application October 19, 1955, Serial No. 541,354

3 Claims. (Cl. 117—68)

This invention relates generally to magnetic recording tape and is particularly directed to providing a new and improved magnetic tape and to methods and apparatus arrangements useful in conjunction with the new tape.

A particular object of the invention is to provide a tape structure which yields a quality of recording which is suitable for commercial and technical purposes and even for high fidelity applications; which provides a materially increased recording time for a given length of tape and recording speed; and which is economical to produce. Such a tape is attained by providing for magnetic recording on opposed faces of the tape.

A primary object of the invention is to provide a new arrangement of magnetic recording heads in which arrangement provision is made for utilizing the full capacity of a tape which is magnetizable on opposed faces thereof.

An important object of the invention is to provide a novel method of producing magnetic tape recordings.

The invention will be more fully understood by reference to the following detailed description and accompanying drawings wherein.

Figures 1, 2, 3, 4, 5:
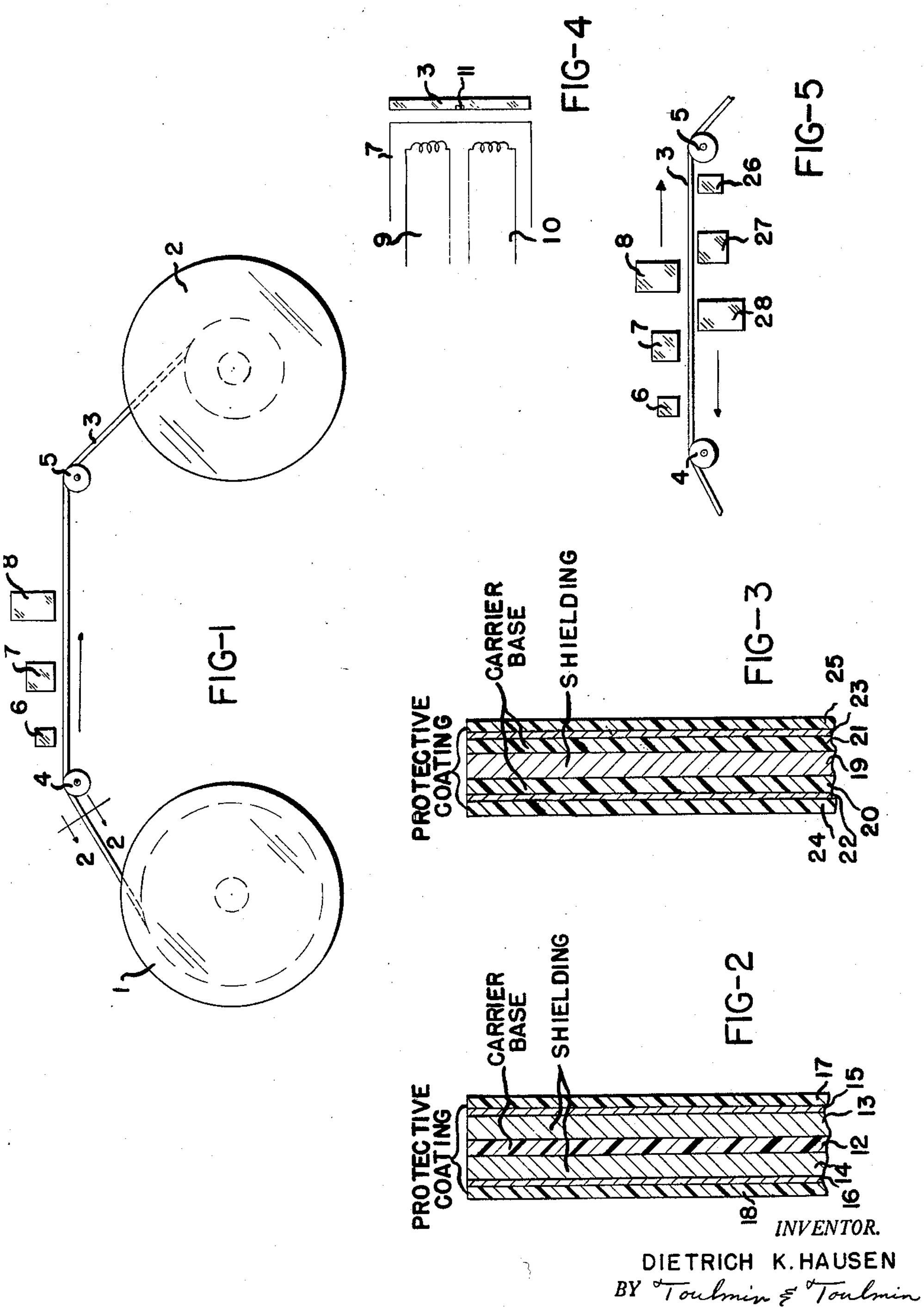
Figure 1 is a schematic plan view of an arrangement for passing a magnetic tape between a supply reel and a take-up reel.
Figure 2 is a sectional view taken on line 2—2 of Figure 1 illustrating one embodiment of the magnetic tape of invention.
Figure 3 is a sectional view similar to that of Figure 2 but illustrating a further embodiment of the tape of invention.
Figure 4 is a schematic view illustrating an arrangement of a magnetic head for effecting magnetization of the upper and lower portions of one side of a magnetic tape.
Figure 5 is a schematic view illustrating a physical arrangement of magnetic heads for effecting magnetization of a tape on each side thereof.

Referring to the drawings, and first particularly to Figure 1, the numeral 1 designates a supply reel and the numeral 2 indicates a take-up reel for a magnetic tape 3. The tape 3 passes from the supply reel 1 to the take-up reel 2 over guide pulleys 4 and 5.

As is customary in such arrangements the tape may be fed from the normal supply reel to the take-up reel or from the take-up reel back to the supply reel.

The numeral 6 designates an erasure head, the numeral 7 a recording head, and the numeral 8 a reproducing head, while the arrow indicates the direction of movement of the tape in the production of a magnetic recording.

Referring briefly to Figure 4 it will be noted that the recording head 7 is provided with upper and lower recording head coils 9 and 10, respectively, and that one side of the tape 3 may carry two magnetic tracks, one provided by the coil 9 on the upper side of the tape 3 as shown in Figure 4 and the other by the coil 10 on the lower side of the tape 3. The numeral 11 designates a narrow non-magnetic center strip which extends longitudinally of the tape and which may be employed if desired in such tapes to separate the two parallel recording tracks.

Referring now to Figure 2 the tape of invention is illustrated therein and comprises a carrier base indicated by the numeral 12. This base is suitably a film of Mylar having a thickness of approximately 1/150 of a millimeter. The opposed faces of the Mylar strip are each provided with a layer of aluminum, one layer being designated by the numeral 13 and the other by the numeral 14. The aluminum serves as a magnetic shield and prevents the passage of magnetic fields across the tape. Each aluminum shielding may suitably have a thickness of 1/100 of a millimeter.

Shown at 15 and 16 are layers of magnetizable material each of which may suitably comprise a ferrous base such as red magnetic oxide of iron with a suitable binder material such as a synthetic resin or a mixture thereof. The thickness of each magnetizable layer is 1/1000 of a millimeter.

On the outer side of each magnetic recording layer there is provided a protective coating of Mylar film. These coatings are indicated at 17 and 18 and they serve both to protect the ferrous layer from mechanical injury and also to inhibit any tendency of the tape in reel form to magnetic print.

A further modification of the tape of invention is shown in cross section in Figure 3 wherein the magnetic shielding is provided centrally of the thickness of the tape and is indicated by the numeral 19. On each face of this magnetic shielding, which suitably is a strip of aluminum metal, there is provided a carrier base of a plastic film such as Mylar, a polyethylene of terephthalic acid, or cellulose acetate ribbon, for example. These carrier base layers are indicated at 20 and 21.

Each carrier base layer is provided on the outer face thereof with a layer of magnetizable material, which may suitably be ferro-magnetic particles impregnated in the carrier base layer, or may be red magnetic oxide of iron in a suitable binder such as a synthetic resin. These magnetizable layers are indicated at 22 and 23, respectively.

On the outer face of each magnetizable layer there is provided a coating of Mylar; this coating may also be cellulose acetate, for example. These outer protective coating layers of Mylar are indicated at 24 and 25, respectively, in Figure 3.

The thicknesses of the materials utilized in the structure of Figure 3 may be approximately the same as those used in the structure of Figure 2; and in general the thickness of the protective coating of Mylar may be varied slightly to accommodate the tape to a particularly desired thickness without deleteriously affecting the other characteristics of the tape.

The tape described in Figures 2 and 3 may suitably have four recording tracks supplied thereto, two on each face of the tape, that is, two on each magnetic recording layer. The two on each face are provided as indicated in Figure 4.

Utilization of all four recordings, or in fact the production of the recordings, is accomplished either by removing the reel and turning it over or by switching the recording or receiving device, electronically for example.

One apparatus for utilizing the tape is illustrated schematically in Figure 5 wherein the tape 3 may be passed over guide rolls 4 and 5 through suitably energized heads 6, 7 and 8, as described in connection with Figure 1, with the tape operating in the direction of the upper arrow. The tape may also be operated in reverse direction as indicated by the lower arrow, the heads 6, 7 and 8 then being deenergized and the erasure head 26, the recording head 27 and the reproducing head 28 being energized as required for recording or reproduction.

In connection with the novel tape of invention and the structure described, for the most efficient utilization of the same, it is to be noted that the tape will provide a very good frequency response even in high fidelity applications. In its operation if one energizes a first layer the magnetic field will be absorbed, deflected and attenuated by the shielding, and thus the layer on the opposed side of the tape is not sufficiently energized to affect it. Further upon energization of the second layer any reflection left from energizing the first part of the tape will be cancelled.

In connection with the magnetizing layers themselves such may suitably be formed of the known materials for such layers, such as red magnetic oxide of iron. For voice recording purposes the tape may have a recording layer of nickel to a thickness of approximately 1/1000 of a millimeter; this layer is a substitute for the red magnetic oxide of iron and as noted may be very thin, approximately one-tenth that of the shielding material.

The thickness of the protective coatings on the tapes described is preferably very thin, although it may be varied somewhat to provide a desired overall thickness of tape. The coatings impede cross-talk, as well as providing protection against mechanical injury.

The composite tape thus described is flexible and suitable for commercial purposes.

It will be understood that this invention is susceptible to modification in order to adapt it to different usages and conditions and accordingly, it is desired to comprehend such modifications within this invention as may fall within the scope of the appended claims.

I claim:

1. A magnetic tape comprising a pair of magnetic recording layers, and means magnetically shielding one layer from the other, said means comprising a layer of aluminum disposed between the magnetic recording layers.

2. A magnetic tape comprising a layer of aluminum, a layer of non-magnetizable material on each face of the aluminum, and a magnetic recording layer on each layer of non-magnetizable material.

3. A magnetic tape comprising a layer of aluminum, a layer of non-magnetizable material on each face of the aluminum, a magnetic recording layer on each layer of non-magnetizable material, and a protecting coating of non-magnetizable material on each magnetic recording layer.

References Cited in the file of this patent

UNITED STATES PATENTS

| | | |
|---|---|---|
| 2,110,090 | Ligh | Mar. 1, 1938 |
| 2,273,916 | Westerkamp | Feb. 24, 1942 |
| 2,443,756 | Williams | June 22, 1948 |
| 2,542,506 | Gibson | Feb. 20, 1951 |
| 2,550,803 | Goodard | May 1, 1951 |
| 2,643,130 | Kornei | June 23, 1953 |
| 2,647,750 | Camras | Aug. 4, 1953 |
| 2,686,676 | Rowe | Aug. 17, 1954 |
| 2,691,072 | Mathes | Oct. 5, 1954 |
| 2,697,754 | Ranger | Dec. 21, 1954 |
| 2,711,901 | Von Behren | June 28, 1955 |
| 2,714,133 | Barry | July 26, 1955 |